United States Patent
Imai (10) Patent No.: US 8,121,656 B2
(45) Date of Patent: Feb. 21, 2012

(54) MOBILE APPARATUS, POWER SAVING CONTROL METHOD IN MOBILE APPARATUS, AND COMPUTER-READABLE MEDIUM

(75) Inventor: Akira Imai, Hino (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 373 days.

(21) Appl. No.: 12/475,724

(22) Filed: Jun. 1, 2009

(65) Prior Publication Data
US 2010/0120477 A1    May 13, 2010

(30) Foreign Application Priority Data
Nov. 12, 2008 (JP) ............................... P2008-289793

(51) Int. Cl.
H04M 1/00 (2006.01)

(52) U.S. Cl. ....................................... 455/574; 455/566

(58) Field of Classification Search ............... 455/550.1, 455/560, 566, 574, 575.1, 343.1, 343.2, 343.3, 455/343.4
See application file for complete search history.

(56) References Cited

U.S. PATENT DOCUMENTS

| 6,915,143 | B2 * | 7/2005 | Kashu et al. | 455/560 |
| 7,761,120 | B2 * | 7/2010 | Tsuchi et al. | 455/566 |
| 2002/0111200 | A1 * | 8/2002 | Nikawa et al. | 455/574 |

FOREIGN PATENT DOCUMENTS

| JP | 2003-134039 A | 5/2003 |
| JP | 2007-166071 A | 6/2007 |

* cited by examiner

Primary Examiner — Thanh Le
(74) Attorney, Agent, or Firm — Maschoff Gilmore & Israelsen (57) ABSTRACT

A mobile apparatus including: a wireless communication module that receives a signal transmitted via a base station; a display that displays character; an input module that inputs the character or operation data; a first operating mode in which electric power is supplied to the display; a second operating mode in which electric power is not supplied to the display; an information reception module that receives information received via the wireless communication module or power saving monitoring information; an input monitoring module that monitors an unoperated state; a display controller that switches the first operating mode to the second operating mode when the unoperated state is detected; and a power saving controller that reduces information reception frequency at the information reception module when the unoperated state is detected by the input monitoring module.

16 Claims, 5 Drawing Sheets

MOBILE APPARATUS, POWER SAVING CONTROL METHOD IN MOBILE APPARATUS, AND COMPUTER-READABLE MEDIUM

CROSS-REFERENCE TO RELATED APPLICATIONS

The entire disclosure of Japanese Patent Application No. 2008-289793 filed on Nov. 12, 2008, including specification, claims, drawings and abstract is incorporated herein by reference in its entirety.

BACKGROUND

1. Field of the Invention

One aspect of the invention relates to a mobile apparatus having a communication function and performing periodic terminal information processing especially in a standby state, a power saving control method in the mobile apparatus and a computer-readable medium.

2. Description of the Related Art

Reduction in size and weight of individual components has been regarded as necessary with the increasing demand for reduction in size and weight of mobile apparatuses in recent years. Most of currently widespread mobile apparatuses use built-in batteries as power supply sources thereof. These batteries are no exception to the demand for reduction in size and weight of individual components. In most cases, reduction in size and weight of a battery however brings about reduction in capacity of the battery, so that reduction in capacity of the battery brings about reduction in operating time of the battery. Moreover, there is an increasing demand for elongation in battery-operating time of a mobile apparatus in order to save labor for charging the battery.

For example, reduction in power consumption is a necessary and essential factor to elongate the battery-operating time of a cellular phone which is one of mobile apparatuses. To take one example, electric power consumed in communication is reduced by widening the time interval for communication between a Bluetooth terminal and the cellular phone in accordance with the time interval for reception of incoming information from a wireless communication base station (see JP-A-2007-166071, for instance).

The cellular phone consumes electric power due to various operations such as communication with the wireless base station, processing of applications, etc. Especially, power consumption in a standby state has a direct relation to the operable time of the cellular phone. There is an increasing demand particularly for reduction in power consumption in the standby state because power consumption in the standby state is an important factor for consideration of reduction in power consumption of the cellular phone. To take one example, LED blinking in the cellular phone in the standby state is controlled by a low-frequency clock generator without interposition of a controller to thereby reduce a processing load imposed on the controller to consequently reduce electric power consumed by the controller (see JP-A-2003-134039, for instance).

The cellular phone in the standby state periodically checks various kinds of information including internal information such as battery voltage level information and external information such as time information, electric field intensity information, push message information, etc. acquired from the outside by wireless communication, sends the checked information to the controller and displays the necessary of the checked information on a display. The push message information includes Wireless Application Protocol (WAP) push message information, Digital Rights Management (DRM) information, casting information, and weather information transmitted from a radio wave base station, etc.

Electric power is consumed whenever such information is checked. Electric power is further consumed due to information processing of the controller whenever the checked information is sent to the controller. Because the cellular phone in the standby state performs checking and sending of these kinds of information periodically, there is a problem that power consumption for checking and sending of these kinds of information results in shortening the operating time of the cellular phone.

There has recently arrived a cellular phone with a so-called power saving mode in which power consumption is reduced by switching off a display when a user does not use the cellular phone in the standby state.

The cellular phone with a power saving mode according to the related art is however inefficient because information to be displayed on the display is checked periodically at short time intervals regardless of switching-off of the display in the power saving mode.

SUMMARY

According to an aspect of the invention, there is provided a mobile apparatus including: a wireless communication module configured to receive a signal transmitted via a base station; a display configured to display graphic or character; an input module configured to input at least one of the graphic or character and operation data; a first operating mode in which electric power is supplied to the display; a second operating mode in which electric power is not supplied to the display; an information reception module configured to receive at least one of information received via the wireless communication module and power saving monitoring information of the mobile apparatus; an input monitoring module configured to monitor an unoperated state that includes a state where the input module is not operated; a display controller configured to switch the first operating mode to the second operating mode when the unoperated state is detected by the input monitoring module; and a power saving controller configured to reduce information reception frequency at the information reception module when the unoperated state is detected by the input monitoring module.

BRIEF DESCRIPTION OF THE DRAWINGS

Embodiment may be described in detail with reference to the accompanying drawings, in which.

DETAILED DESCRIPTION OF THE EMBODIMENTS

An embodiment of the invention will be described below with reference to the drawings.

Figures 1A, 1B:
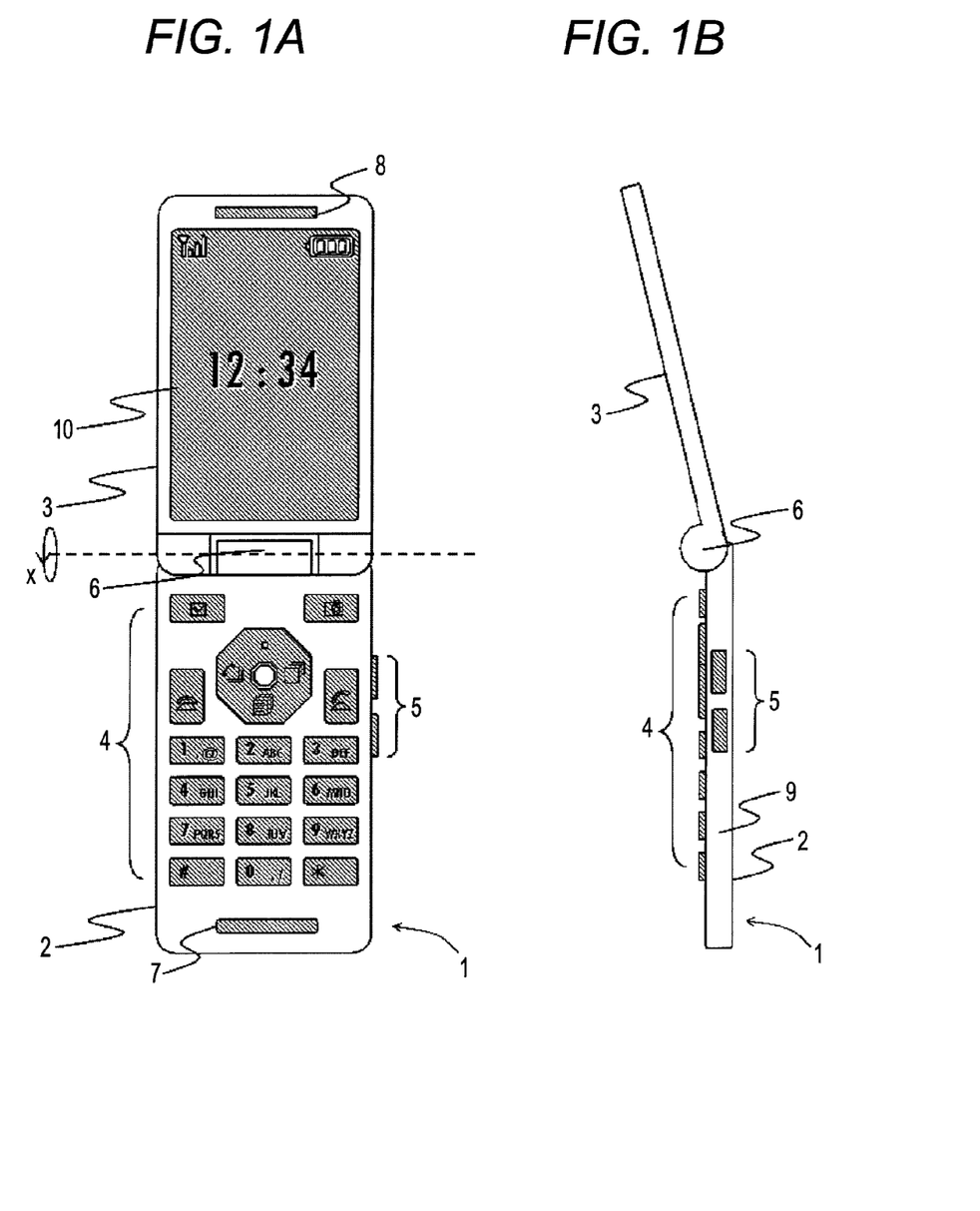
FIGS. 1A and 1B are views showing an external configuration of a foldable cellular phone as an example of a mobile apparatus according to an embodiment of the invention.

FIGS. 1A and 1B show an external configuration of a foldable cellular phone 1 as an example of a mobile apparatus according to the invention. FIG. 1A is a front view showing the external configuration of the cellular phone 1 in an open state in which the cellular phone 1 is unfolded at about 180 degrees. FIG. 1B is a side view showing the external configuration of the cellular phone 1 in the open state.

As shown in FIGS. 1A and 1B, a first casing 2 and a second casing 3 are coupled to each other through a hinge portion 6 located in the center of the cellular phone 1 so that the cellular phone 1 is formed so as to be foldable through the hinge portion 6 in a direction of an arrow X. A transmission/reception antenna (an antenna 21 shown in FIG. 3 as will be described later) is provided in a certain position inside the cellular phone 1. The cellular phone 1 transmits/receives radio waves through the built-in antenna to/from a base station not shown.

An operation keypad 4 including numeric keys "0" to "9", a call-out/call-in key, a redial key, a disconnect/power key, a clear key, a menu key etc. is provided in a front face of the first casing 2. In addition, a side key group 5 including a manner mode key, a power saving key etc. is provided in a side face of the first casing 2. A user can input various instructions or data to the cellular phone 1 by using the operation keypad 4 or the side key group 5.

A microphone 7 is provided in a lower portion of the operation keypad 4 in the first casing 2 so that the microphone 7 collects user's voice when the cellular phone 1 is connected.

Incidentally, a battery 9 is mounted in a rear face of the first casing 2. When the cellular phone 1 is turned on by long-term pressing of the disconnect/power key, the battery 9 supplies electric power to respective circuit modules which will be described later.

On the other hand, a main display 10 is provided in a front face of the second casing 3. A mail, a website, a received push message, etc. as well as a radio wave reception status, a residual battery capacity and the present time can be displayed on the main display 10. For example, the main display 10 is a Liquid Crystal Display (LCD) or an organic Electro Luminescence (EL) display. A receiver 8 is provided in a certain position of an upper portion of the main display 10. The user can hear voice/sound transmitted from a communication partner by using the receiver 8.

Figure 2A:
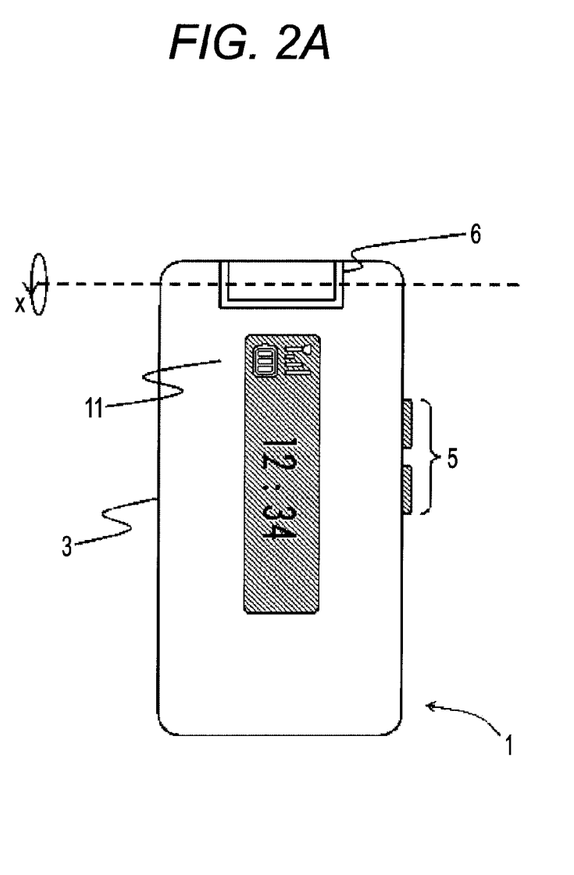
FIGS. 2A and 2B are views showing another external configuration of the foldable cellular phone as an example of the mobile apparatus according to the embodiment of the invention.
Figure 2B:
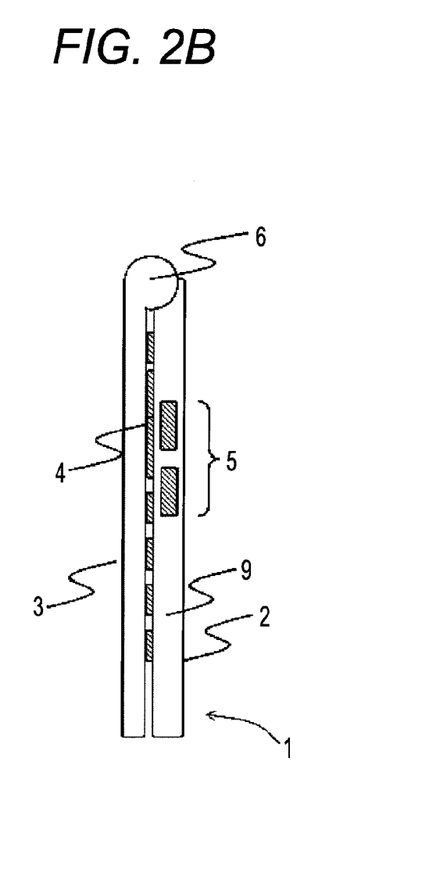

FIGS. 2A and 2B show another external configuration of the foldable cellular phone 1 as an example of the mobile apparatus according to the invention when the cellular phone 1 is folded. FIG. 2A is a front view showing the external configuration of the cellular phone 1 in a close state in which the cellular phone 1 is folded. FIG. 2B is a side view showing the external configuration of the cellular phone 1 in the close state.

A sub display 11, for example, made of an LCD is provided in a front face of the second casing 3. For example, an antenna picture indicating the level of electric field intensity received currently by the antenna 21, a battery picture indicating the residual capacity of the battery 9, the present time, etc. can be displayed on the sub display 11. The side key group 5 is provided in the second casing 3 so as to be located in an operable position even when the mobile apparatus is folded.

Figure 3:
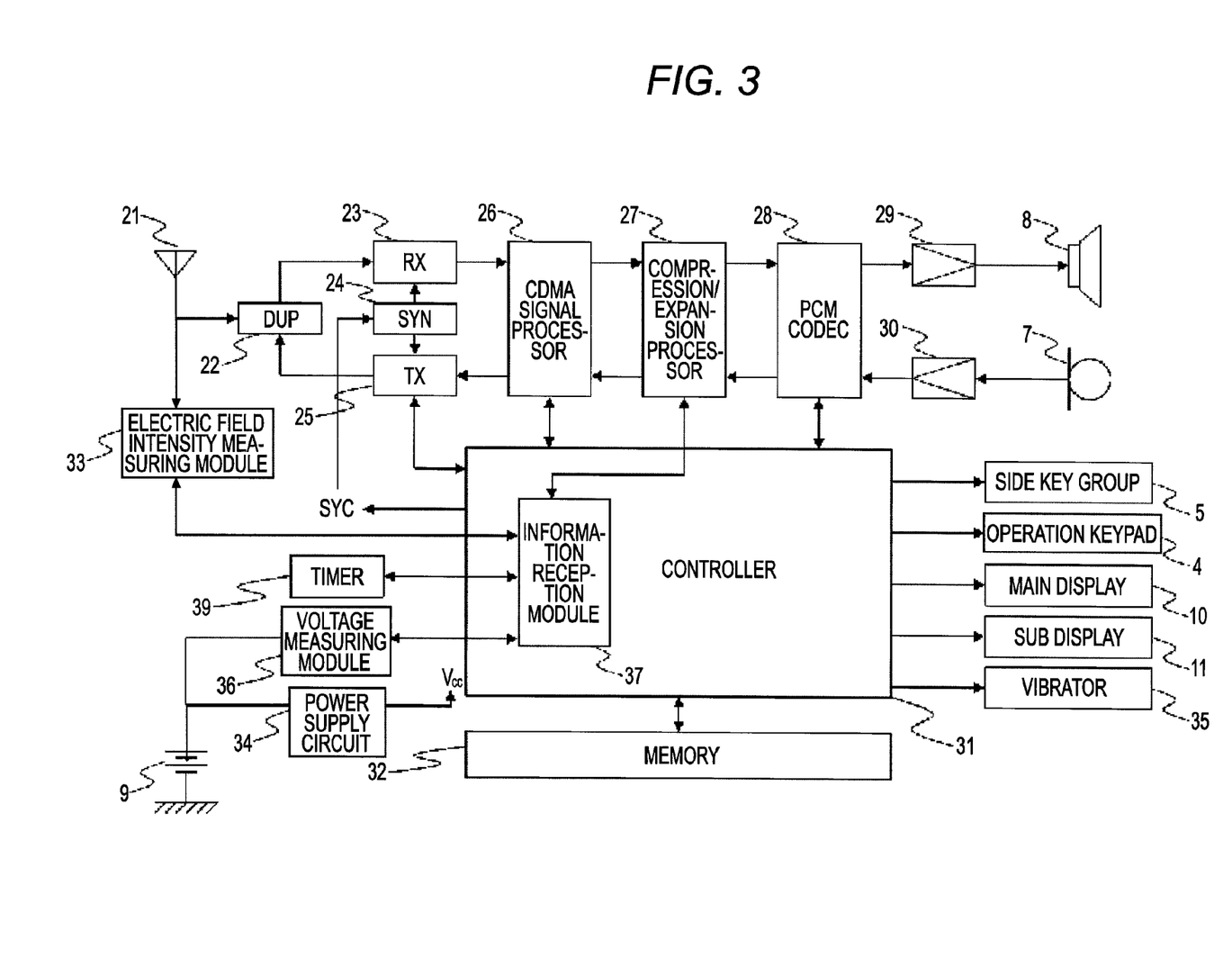
FIG. 3 is an exemplary diagram showing an internal configuration of the cellular phone in the embodiment.

FIG. 3 is a block diagram showing the internal configuration of the cellular phone 1 in the embodiment.

After a radio signal transmitted from a not-shown base station is received by the antenna 21, the radio signal is input to a receiving circuit (RX) 23 through an antenna duplexer (DUP) 22. On this occasion, the level of electric field intensity received by the antenna 21 is measured by an electric field intensity measuring module 33, so that the measured level of electric field intensity is transmitted to a controller 31. The receiving circuit 23 down-coverts the received radio signal into an intermediate frequency signal by mixing the received radio signal with a local oscillation signal output from a frequency synthesizer (SYN) 24. The down-converted intermediate frequency signal is quadrature-demodulated and output as a reception baseband signal from the receiving circuit 23.

The reception baseband signal output from the receiving circuit 23 is input to a Code Division Multiple Access (CDMA) signal processor 26. The CDMA signal processor 26 has a Rake receiver not shown. In the Rake receiver, paths contained in the reception baseband signal are inversely diffused with diffusion codes (i.e. diffusion codes the same as those of diffused reception signals) respectively. After the phases of respective signals of the inversely diffused paths are rotated, the signals are coherently Rake combined. After the Rake combined data series is subjected to de-interleaving and channel decoding (error correction decoding), two-value data evaluation is made. In this manner, reception packet data of a given transfer format is generated by the CDMA signal processor 26. The reception packet data output from the CDMA signal processor 26 is input to a compression/expansion processor 27.

The compression/expansion processor 27 is made of a Digital Signal Processor (DSP). The compression/expansion processor 27 demultiplexes the reception packet data output from the CDMA signal processor 26 in accordance with media by using a multiplexing/demultiplexing module not shown, and then decodes the demultiplexed data for the media respectively.

On the other hand, a user's voice signal input to the microphone 7 in a connection mode is amplified to a proper level by a transmission amplifier 30 and then PCM-coded by a PCM codec 28. The PCM-coded digital audio signal is input to the compression/expansion processor 27. In addition, text data such as a mail generated by the controller 31 is input to the compression/expansion processor 27.

The compression/expansion processor 27 compression-codes the digital audio signal output from the PCM codec 28 in a format corresponding to a given transmission data rate. In this manner, the digital audio data is output from the compression/expansion processor 27 to the CDMA signal processor 26. In addition, a digital motion picture signal output from the controller 31 is converted into compression-coded motion picture data by the compression/expansion processor 27. After these audio data and motion picture data are multiplexed in accordance with the given transfer format by the multiplexing/demultiplexing module not shown, the multiplexed data is packetized. The packetized transmission packet data is output to the CDMA signal processor 26.

The CDMA signal processor 26 applies spectrum diffusion processing to the transmission packet data output from the compression/expansion processor 27 with diffusion codes allocated to a transmission channel to thereby output a spectrum-diffused signal to a transmitting circuit (TX) 25. The transmitting circuit 25 modulates the spectrum-diffused signal by a digital modulation method such as a Quadrature Phase Shift Keying (QPSK) method. The transmitting circuit 25 up-converts the digital modulated transmission signal into a radio signal by combining the digital modulated transmission signal with a local oscillation signal generated by the frequency synthesizer 24. The transmitting circuit 25 amplifies the up-converted radio signal to satisfy a transmission power level designated by the controller 31. The amplified radio signal is supplied to the antenna 21 through the antenna duplexer 22 and then transmitted to the not-shown base station via the antenna 21.

A clock signal generator (timer) 39 for calculating a given cycle time and generating a clock signal at each cycle time to be supplied to the controller 31 is provided in the cellular phone 1. A power supply circuit 34 provided in the cellular phone 1 generates a given operating power supply voltage Vcc by A/D conversion of an analog voltage output of the battery 9 and feeds the operating power supply voltage Vcc to the aforementioned respective circuit modules. Further, a voltage measuring module 36 provided in the cellular phone 1 measures a voltage output from the battery 9 and notifies the controller 31 of the measured output voltage.

The controller 31 includes electronic circuits such as a Central Processing Unit (CPU), a Read Only Memory (ROM), a Random Access Memory (RAM), etc. The CPU performs processing in accordance with a program stored in the ROM or various application programs loaded into the RAM from a memory 32. Moreover, the CPU generally controls the cellular phone 1 by processing signals supplied from the aforementioned respective circuit modules, generating various control signals and supplying the generated control signals to the aforementioned respective circuit modules. In addition, data required for CPU's performing the various processes is stored in the RAM. The controller 31 includes a video RAM not shown. Information about video displayed on the main display 10 is temporarily stored in the video RAM. The memory 32 is made of an electrically rewritable/erasable nonvolatile memory such as a flash memory device, a Hard Disc Drive (HDD), etc. Various application programs to be performed by the CPU of the controller 31 and data sets necessary for performance are stored in the memory 32.

An information reception module 37 is a module which is provided as a function of the controller 31 and which receives power saving monitoring information such as a push message output from the compression/expansion processor 27, an electric field intensity level received by the antenna 21 and output from the electric field intensity measuring module 33, a voltage level of the battery 9 output from the voltage measuring module 36 and time information output from the timer 39. The information received by the information reception module 37 is output to a timer monitoring module 62, an electric field intensity monitoring module 63, a voltage level monitoring module 64, a time monitoring module 65 and a protocol module 66 which will be described later. Although a push message, an electric field intensity level, a voltage level and time information have been exemplified here as the power saving monitoring information received by the information reception module 37, the same effect can be also obtained when configuration is made so that at least one of these examples of the information is received.

Figure 4:
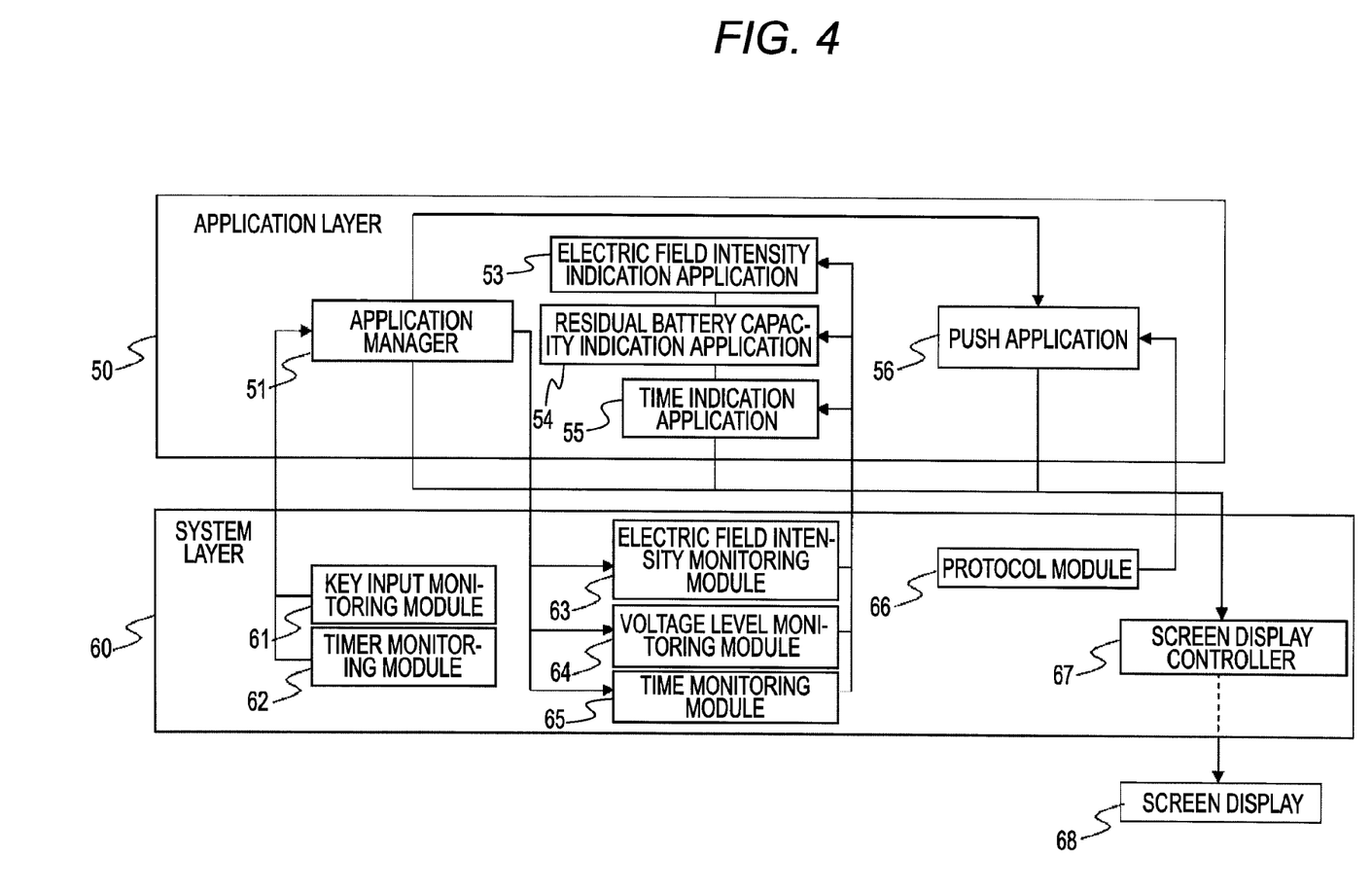
FIG. 4 is an exemplary system configuration diagram of the cellular phone in the embodiment.

The configuration of a system portion of the cellular phone according to an embodiment of the invention will be described below. FIG. 4 is a system configuration diagram showing a configuration about operation of the controller 31 according to the embodiment.

The system portion in the cellular phone according to the embodiment is a configuration member of the controller 31 and can be roughly classified into two layers, i.e. an application layer 50 and a system layer 60. The application layer 50 plays a role in performing processing by using a set of applications configuring the application layer 50 in order to achieve a function or effect required of the user. The system layer 60 plays a role in receiving data necessary for processing performed by the application layer 50 from the aforementioned hardware and outputting the received data to the application layer 50 and a role in outputting a command for driving the hardware based on a result of the processing given from the application layer 50.

The application layer 50 contains the following application programs. First, an application manager 51 generally controls applications by generating various kinds of application control information based on control information given from the system layer 60 and supplying the generated application control information to the respective applications and to the system layer 60.

Next, an electric field intensity indication application 53 receives notification of an electric field intensity level value detected by the electric field intensity monitoring module 63 and outputs a control command to a screen display controller 67 (which will be described later) to rewrite the antenna picture displayed in the sub display 11 in accordance with the electric field intensity level.

A residual battery capacity indication application 54 receives notification of an output voltage value of the battery 9 from the voltage level monitoring module 64 monitoring the output voltage of the battery 9 and outputs a control command to the screen display controller 67 (which will be described later) to rewrite the battery picture displayed in the sub display 11 in accordance with the voltage intensity level.

A time indication application 55 receives notification of time information output from the timer 39 and outputs a control command to the screen display controller 67 to rewrite the time displayed in the sub display 11.

A push application 56 is a module which stores push messages output from the protocol module 66 (which will be described later) in the memory 32 and periodically applies reception processing to the push messages stored in the memory 32. When a received push message contains information such as casting information or weather information to be displayed on the sub display 11, the push application 56 outputs a control command to the screen display controller 67 to display the information.

The system layer 60 of the controller 31 has the following processing functions. A key input monitoring module 61 plays a role in monitoring whether or not there is an input from any key of the operation keypad 4 and the side key group 5, and sending a notification to the application manager 51 when the input is detected. The timer monitoring module 62 plays a role in notifying the application manager 51 of timer information using a clock signal output from the timer 39.

The electric field intensity monitoring module 63 plays a role in notifying the electric field intensity indication application 53 of electric field intensity level information when the value of the electric field intensity level output by the electric field intensity measuring module 33 through the information reception module 37 changes so largely as to exceed a threshold value. The voltage level monitoring module 64 plays a role in notifying the residual battery capacity indication application 54 of voltage level information when the value of the voltage level output through the information reception module 37 from the voltage measuring module 36 measuring the voltage of the battery 9 changes so largely as to exceed a threshold value.

The time monitoring module 65 plays a role in notifying the time indication application 55 of the present time information acquired by wireless communication through the information reception module 37. The protocol module 66 plays a role in receiving a push message transmitted from a communication network through the information reception module 37 and outputting the received push message to the push application 56. The screen display controller 67 plays a role in driving a screen display 68 to perform display control of the main display 10 or the sub display 11 in accordance with a screen output command output from any one of applications in the application layer 50.

Incidentally, a combination of the electric field intensity monitoring module 63 and the electric field intensity indication application 53, a combination of the voltage level monitoring module 64 and the residual battery capacity indication application 54 and a combination of the time monitoring module 65 and the time indication application 55 respectively serve as a power saving control function. Although description has been made in the case where the power saving function is operated by all the combinations, the power saving function may be operated by at least one of the combinations.

Here, for example, WAP push messages are used as the push messages. For example, among the WAP push messages, there is an Email Notification (EMN) as a push format for realizing notification of an incoming e-mail. In the EMN, a push server notifies the cellular phone 1 of an incoming e-mail by using a Short Message Service (SMS) or the like.

Upon reception of the notice of an incoming e-mail from the EMN, the cellular phone 1 accesses a mail server by using a mail protocol such as Post Office Protocol (POP) or Internet Mail Access Protocol (IMAP) to receive a mail header and a mail text. In the WAP push, a push server notifies the cellular phone 1 of an incoming e-mail. Upon reception of the notice of an incoming e-mail from the push server, the cellular phone 1 accesses a mail server to receive an e-mail text from the mail server in order to acquire the e-mail text. By the aforementioned operation, the cellular phone 1 receives push data.

Figure 5:
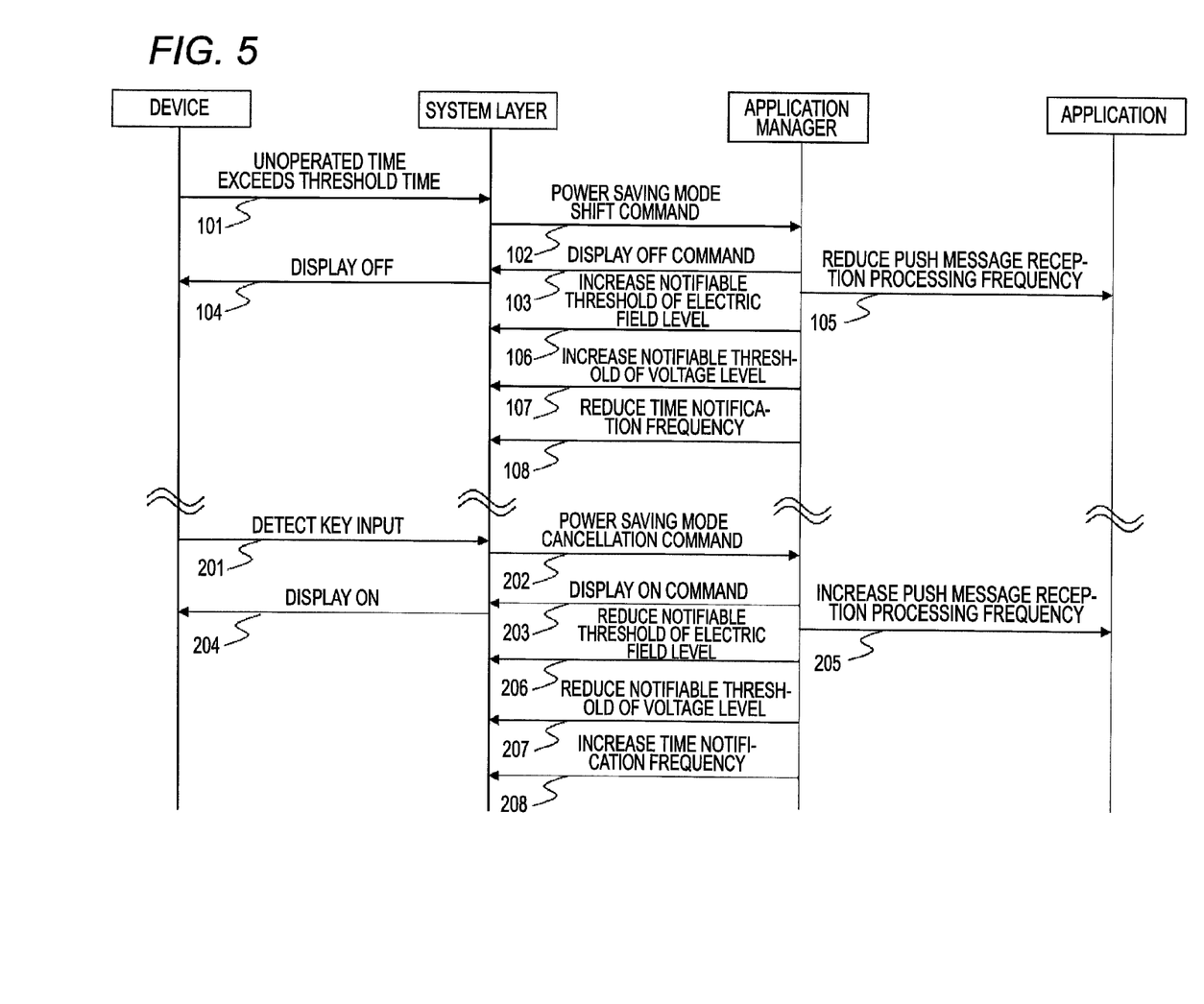
FIG. 5 is an exemplary sequence diagram showing a flow of shift processing from a power non-saving mode to a power saving mode and shift processing from the power saving mode to the power non-saving mode in this embodiment.

A flow of shift processing between the power non-saving mode and the power saving mode according to the embodiment will be described below. FIG. 5 is a sequence diagram showing a flow of shift processing from the power non-saving mode to the power saving mode or a flow of shift processing from the power saving mode to the power non-saving mode. Incidentally, the power non-saving mode means a state of the cellular phone 1 currently used by the terminal user, such as a state where the cellular phone 1 is connected, a Website browsing state, an other contents browsing state, a mail document creating or browsing state and a terminal menu operating state.

(Shift from Power Non-Saving Mode to Power Saving Mode)

First, assume that the cellular phone 1 is in a standby state. When the controller 31 detects that any one of the operation keypad 4 and the side key group 5 has not been operated for a threshold time or longer, the controller 31 notifies the key input monitoring module 61 in the system layer 60 of the fact that there is no key input (step 101). Upon reception of this notice, the key input monitoring module 61 outputs a power saving mode shift command to the application manager 51 (step 102).

When, upon reception of the power saving mode shift command in the step S102, the application manager 51 is shifted to the power saving mode, the application manager 51 outputs a display OFF command to the screen display controller 67 (step 103). When, upon reception of the display OFF command in the step 103, the screen display controller 67 performs an operation of turning off the screen display 68, display disappears from the main display 10 and the sub display 11. By the aforementioned operation, display on the main display 10 and the sub display 11 is turned off at the same time that the application layer 50 is shifted to the power saving mode (step 104).

When shifted to the power saving mode, the application manager 51 performs a command to reduce push message reception processing frequency of the push application 56 (step 105).

The application manager 51 further performs a command to increase the notifiable threshold of the electric field intensity level in the electric field intensity monitoring module 63 (step 106). In the power non-saving mode, the electric field intensity monitoring module 63 notifies the electric field intensity indication application 53 of the electric field intensity level whenever the electric field intensity changes, for example, by 1 dB. After the power non-saving mode is shifted to the power saving mode by a command from the application manager 51, the notifiable threshold of the electric field intensity level is changed so that the electric field intensity monitoring module 63 notifies the electric field intensity indication application 53 of the electric field intensity level whenever the electric field intensity changes, for example, by 6 dB. As the notifiable threshold increases, the notification frequency decreases.

The application manager 51 further performs a command to increase the notifiable threshold of the voltage level in the voltage level monitoring module 64 (step 107). Similarly to the notification of the electric field intensity level, the voltage level notification frequency of the voltage level monitoring module 64 for the residual battery capacity indication application 54 decreases as the notifiable threshold of the voltage level increases.

The application manager 51 further performs a command to reduce time notification frequency of the time monitoring module 65 (step 108). In this manner, the time notification frequency of the time monitoring module 65 for the time indication application 55 decreases.

By the aforementioned operation, the push application 56 in the application layer 50 and the respective monitoring modules in the system layer 60 are shifted to the power saving mode. In this manner, it is possible to turn off display on the main display 10 and the sub display 11 and, at the same time, it is possible to reduce frequency of notifications of power saving monitoring information such as message reception processing frequency of the push application 56, electric field intensity change notification frequency of the electric field intensity monitoring module 63, voltage level change notification frequency of the voltage level monitoring module 64, and time notification frequency of the time monitoring module 65.

Consequently, the throughput of the controller 31 is reduced greatly.

Because the aforementioned great reduction in the throughput of the controller 31 leads to reduction in the start-up time of the controller 31, power consumption of the controller 31 can be saved. Shift to the power saving mode in the step 101 is triggered by the unoperated state of the cellular phone 1. In this embodiment, the term 'unoperated state' means a state where any key of the operation keypad 4 and the side key group 5 has not been input for a threshold time. However, the unoperated state may be detected based on detection of an operation of the power saving key or detection of an opening/closing operation of the so-called foldable cellular phone. Although description has been made on the case where the unoperated state is detected based on detection of the time for which any key of the operation keypad 4 and the side key group has not been operated, the same effect can be also obtained in the case where all of or at least two of detection of the time for which any key has not been operated, detection of the operation of the power saving key and detection of the opening/closing operation of the cellular phone are used in combination to detect the unoperated state.

(Shift from Power Saving Mode to Power Non-Saving Mode)

A flow of shift processing from the power saving mode to the power non-saving mode will be described below. When the key input monitoring module 61 detects an operation of any key in the operation keypad 4 and the side key group 5 of the cellular phone 1 in the power saving mode, the key input monitoring module 61 notifies the controller 31 of the key input (step 201). At the same time, the key input monitoring module 61 of the controller 31 outputs a power saving mode cancellation command to the application manager 51 (step 202).

Upon reception of the cancellation command in the step 202, the application manager 51 cancels the power saving mode and then outputs a display ON command to the screen display controller 67 (step 203). Upon reception of the display ON command, the screen display controller 67 performs a display ON operation for the screen display 68 to turn on the display indication of the main display 10 and the sub display 11 (step 204). By the aforementioned operation, the display on the main display 10 and the sub display 11 is switched on immediately at a timing when the power saving mode is cancelled.

When shifted to the power non-saving mode, the application manager 51 performs a command to increase push message reception processing frequency of the push application 56 to restore the frequency to its original frequency in reception processing in the power non-saving mode (step 205). The application manager 51 further performs a command to reduce the notifiable threshold of the electric field intensity level in the electric field intensity monitoring module 63 to restore the notifiable threshold to its original notifiable threshold in the power non-saving mode (step 206). As the notifiable threshold of the electric field intensity level decreases, the notification frequency of the electric field intensity monitoring module 63 for the electric field intensity indication application 53 increases so that the electric field intensity can be displayed more frequently than that in the power saving mode.

The application manager 51 further performs a command to reduce the notifiable threshold of the voltage level in the voltage level monitoring module 64 to restore the notifiable threshold to its original notifiable threshold in the power non-saving mode (step 207). As a result, similarly to the notification of the electric field intensity level, the notification frequency of the voltage level monitoring module 64 for the residual voltage capacity indication application 54 increases so that the voltage level change can be displayed more frequently than that in the power saving mode.

The application manager 51 further performs a command to increase time notification frequency of the time monitoring module 65 to restore the notification frequency to its original notification frequency in the power non-saving mode (step 208). As a result, the time notification frequency of the time monitoring module 65 for the time display application 55 increases so that the time can be displayed more frequently than that in the power saving mode.

By the aforementioned operation, the power saving mode is cancelled for the push application 56 in the application layer 50 and the respective monitoring modules in the system layer 60. As a result, it is possible to turn on the display indication of the main display 10 and the sub display 11 and, at the same time, it is possible to increase frequencies of notifications of power saving monitoring information, such as message reception processing frequency of the Push application 56, electric field intensity change notification frequency of the electric field intensity monitoring module 63, voltage intensity change notification frequency of the voltage level monitoring module 64 and time notification frequency of the time monitoring module 65. In this manner, more frequent services can be provided to the user of the cellular phone 1 though the throughput of the controller 31 is increased. Incidentally, cancellation of the power saving mode in the step 201 is performed based on detection of cancellation of the unoperated state. Accordingly, shifting to the ordinary mode is performed based on detection of an operation of any key of the operation keypad 4 and the side key group 5, detection of an operation of the power saving key and detection of an opening/closing operation of the so-called foldable cellular phone in the course reserve to that in shifting from the ordinary mode to the power saving mode. Incidentally, the same effect can be also obtained when all or at least one of detection of an operation of any key, detection of an operation of the power saving key and detection of an opening/closing state are used in combination for detecting cancellation of the unoperated state.

As described above, the cellular phone 1 according to the embodiment is designed so that when the power non-saving mode is shifted to the power saving mode, it is possible to turn off the display indication of the main display 10 and the sub display 11 and it is possible to substantially concurrently reduce frequencies of notifications of power saving monitoring information, such as message reception processing frequency of the push application 56, electric field intensity change notification frequency of the electric field intensity monitoring module 63, voltage intensity change notification frequency of the voltage level monitoring module 64, and time notification frequency of the timer monitoring module 65. In this manner, the throughput of the controller 31 is reduced greatly. The great reduction in the throughput of the controller 31 leads to reduction in the start-up time of the controller 31. As a result, power consumption of the controller 31 can be reduced greatly. The reduction in power consumption permits provision of a cellular phone with a long operating time.

The embodiment mentioned here has been described on cellular phone by way of example. However, the scope of the invention is not limited thereto. For example, the invention can be also applied to a Personal Digital Assistant (PDA), a wired terminal, a small-size information processor, etc.

Although the embodiment has been described on a foldable cellular phone by way of example, the invention can be also applied to a slide type mobile apparatus and a bar type mobile apparatus having no movable mechanism.

Although description has been made in the case where the power saving mode is cancelled based on detection of an operation of any key of the operation keypad 4 and the side key group 5, detection of an operation of the power saving key or detection of an opening/closing operation of the foldable cellular phone, the same effect can be also obtained when the power saving mode is canceled based on detection of a sliding operation of a slide type cellular phone.

In the embodiment, push message, electric field intensity, voltage level and time information have been taken as examples of a subject for reduction of information checking frequency. However, the information which is a subject for reduction of information checking frequency is not limited to these examples. For example, the invention can be applied to various kinds of information such as position information and connecting network information. The invention is not limited to the aforementioned embodiment but may be embodied by modification of its configuration members without departure from a point of the invention. Configuration members disclosed in the respective embodiments may be used in suitable combinations for forming various inventions. For example, some configuration elements may be omitted from all the configuration elements disclosed in the respective embodiments.

What is claimed is:

1. A mobile apparatus comprising:
a wireless communication module configured to receive a signal transmitted via a base station;
a display configured to display graphic or character;
an input module configured to input at least one of the graphic or character and operation data;
a first operating mode in which electric power is supplied to the display;
a second operating mode in which electric power is not supplied to the display;
an information reception module configured to receive at least one of information received via the wireless communication module and power saving monitoring information of the mobile apparatus;
an input monitoring module configured to monitor an unoperated state that includes a state where the input module is not operated;
a display controller configured to switch the first operating mode to the second operating mode when the unoperated state is detected by the input monitoring module; and
a power saving controller configured to reduce information reception frequency at the information reception module when the unoperated state is detected by the input monitoring module.

2. The mobile apparatus of claim 1, wherein the power saving controller is configured to reduce information reception frequency at the information reception module in accordance with the switching to the second operating mode.

3. The mobile apparatus of claim 2, wherein the power saving monitoring information includes at least one of: reception processing information of a message given from a push application, information of a notice of electric field intensity change given from a voltage level monitoring module, and information of a notice of time given from a time monitoring module.

4. The mobile apparatus of claim 2, wherein:
the display controller is configured to switch the second operating mode back to the first operating mode when the unoperated state is not detected by the input monitoring module; and
the power saving controller is configured to increase the reduced information reception frequency to original frequency in accordance with the switching to the first operating mode.

5. The mobile apparatus of claim 4, wherein the power saving monitoring information includes at least one of: reception processing information of a message given from a push application, information of a notice of electric field intensity change given from a voltage level monitoring module, and information of a notice of time given from a time monitoring module.

6. The mobile apparatus of claim 1, wherein, when the unoperated state is not detected by the input monitoring module:
the display controller is configured to switch the second operating mode back to the first operating mode; and
the power saving controller is configured to increase the reduced information reception frequency to original frequency.

7. The mobile apparatus of claim 6, wherein the power saving monitoring information includes at least one of: reception processing information of a message given from a push application, information of a notice of electric field intensity change given from a voltage level monitoring module, and information of a notice of time given from a time monitoring module.

8. The mobile apparatus of claim 1, wherein the power saving monitoring information includes at least one of: reception processing information of a message given from a push application, information of a notice of electric field intensity change given from a voltage level monitoring module, and information of a notice of time given from a time monitoring module.

9. A power saving control method in a mobile apparatus including: a wireless communication module configured to receive a signal transmitted via a base station; a display configured to display graphic or character; an input module configured to input at least one of the graphic or character and operation data; a first operating mode in which electric power is supplied to the display; a second operating mode in which electric power is not supplied to the display, the power saving control method comprising:
monitoring an unoperated state that includes a state where the input module is not operated;
switching the first operating mode to the second operating mode when the unoperated state is detected; and
reducing frequency of reception of at least one of information received via the wireless communication module and power saving monitoring information of the mobile apparatus when the unoperated state is detected.

10. The power saving control method of claim 9, wherein the reducing step includes reducing frequency of reception of at least one of information received via the wireless communication module and power saving monitoring information of the mobile apparatus in accordance with the switching to the second operating mode.

11. The power saving control method of claim 10, further comprising:
switching the second operating mode back to the first operating mode when the unoperated state is not detected; and
increasing the reduced information reception frequency to original frequency in accordance with the switching to the first operating mode.

12. A power saving control method of claim 9, wherein, when the unoperated state is not detected:
switching the second operating mode back to the first operating mode; and
increasing the reduced information reception frequency to original frequency.

13. A non-transitory computer-readable medium containing software instructions for causing a mobile apparatus to perform a power saving control process, the mobile apparatus including: a wireless communication module configured to receive a signal transmitted via a base station; a display configured to display graphic or character; an input module configured to input at least one of the graphic or character and operation data; a first operating mode in which electric power is supplied to the display; a second operating mode in which electric power is not supplied to the display, wherein the software instructions comprise:
monitoring an unoperated state that includes a state where the input module is not operated;
switching the first operating mode to the second operating mode when the unoperated state is detected; and
reducing frequency of reception of at least one of information received via the wireless communication module and power saving monitoring information of the mobile apparatus when the unoperated state is detected.

14. The non-transitory computer-readable medium of claim 13, wherein the reducing step includes reducing frequency of reception of at least one of information received via the wireless communication module and power saving monitoring information of the mobile apparatus in accordance with the switching to the second operating mode.

15. The non-transitory computer-readable medium of claim 14, wherein the software instructions further comprise:
  switching the second operating mode back to the first operating mode when the unoperated state is not detected; and
  increasing the reduced information reception frequency to original frequency in accordance with the switching to the first operating mode.

16. The non-transitory computer-readable medium of claim 13, wherein the software instructions further comprise switching the second operating mode back to the first operating mode and increasing the reduced information reception frequency to original frequency when the unoperated state is not detected.

* * * * *